(12) United States Patent
Sun

(10) Patent No.: US 8,553,423 B2
(45) Date of Patent: Oct. 8, 2013

(54) MEMORY MODULE HOLDER

(75) Inventor: Zheng-Heng Sun, Tu-Cheng (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 362 days.

(21) Appl. No.: 13/069,521

(22) Filed: Mar. 23, 2011

(65) Prior Publication Data

US 2012/0092841 A1 Apr. 19, 2012

(30) Foreign Application Priority Data

Oct. 18, 2010 (CN) .............................. 2010 1 051085

(51) Int. Cl.
*H05K 5/00* (2006.01)
(52) U.S. Cl.
USPC .............................. 361/759; 361/801; 361/802
(58) Field of Classification Search
USPC ............ 361/727, 756, 759, 801–803; 439/64, 439/326–328, 620.15, 377
See application file for complete search history.

(56) References Cited

U.S. PATENT DOCUMENTS

| 5,943,218 | A | * | 8/1999 | Liu ................................ 361/801 |
| 6,056,579 | A | * | 5/2000 | Richards et al. .............. 439/358 |
| 6,370,036 | B1 | * | 4/2002 | Boe ................................ 361/801 |
| 6,772,261 | B1 | * | 8/2004 | D'Antonio et al. ........... 710/301 |
| 7,145,779 | B2 | * | 12/2006 | Lien .............................. 361/729 |
| 7,922,506 | B1 | * | 4/2011 | Harlan et al. ................. 439/160 |
| 8,246,373 | B2 | * | 8/2012 | Lee ............................... 439/327 |

* cited by examiner

*Primary Examiner* — Hung S Bui
(74) *Attorney, Agent, or Firm* — Altis & Wispro Law Group, Inc.

(57) ABSTRACT

A memory module holder includes a base, two latching elements, and a frame. A slot is defined in the base. The two latching elements are rotatably attached to opposite ends of the base. The frame includes a beam portion and two latching portions. The two latching portions are positioned at opposite ends of the beam portion. The latching portions are retained by the latching elements. A receiving space is defined by the frame and the base to receive the memory module when the memory module holder is in a first state. The slot is covered by the beam portion when the memory module holder is in a second state.

19 Claims, 5 Drawing Sheets

MEMORY MODULE HOLDER

BACKGROUND

1. Technical Field

The disclosure generally relates to holders, particularly to a memory module holder.

2. Description of Related Art

Memory modules are used for electronic devices, such as computers, notebooks, and personal digital assistants (PDAs) to store data. A reduction in the size of electronic devices coupled with an increase in higher-speed, larger-capacity memory modules are required. Accordingly, memory module holders, on which a plurality of memory devices can be installed, have been proposed. The memory module holders define a plurality of slots to allow a user to insert additional memory devices when it is desired. However, when memory modules do not occupy the slots, connectors oriented in the slots are exposed and are easily oxidized or covered by dust.

Therefore, there is room for improvement within the art.

BRIEF DESCRIPTION OF THE DRAWINGS

Many aspects of the exemplary memory module holder can be better understood with reference to the following drawings. The components in the drawings are not necessarily drawn to scale, the emphasis instead being placed upon clearly illustrating the principles of the memory module holder. Moreover, in the drawings, like reference numerals designate corresponding parts throughout the several views, in which.

DETAILED DESCRIPTION

The disclosure is illustrated by way of example and not by way of limitation in the accompanying drawings. It should be noted that references to "an" or "one" embodiment in this disclosure are not necessarily to the same embodiment, and such references can include the meaning of "at least one" embodiment where the context permits.

Figure 1:
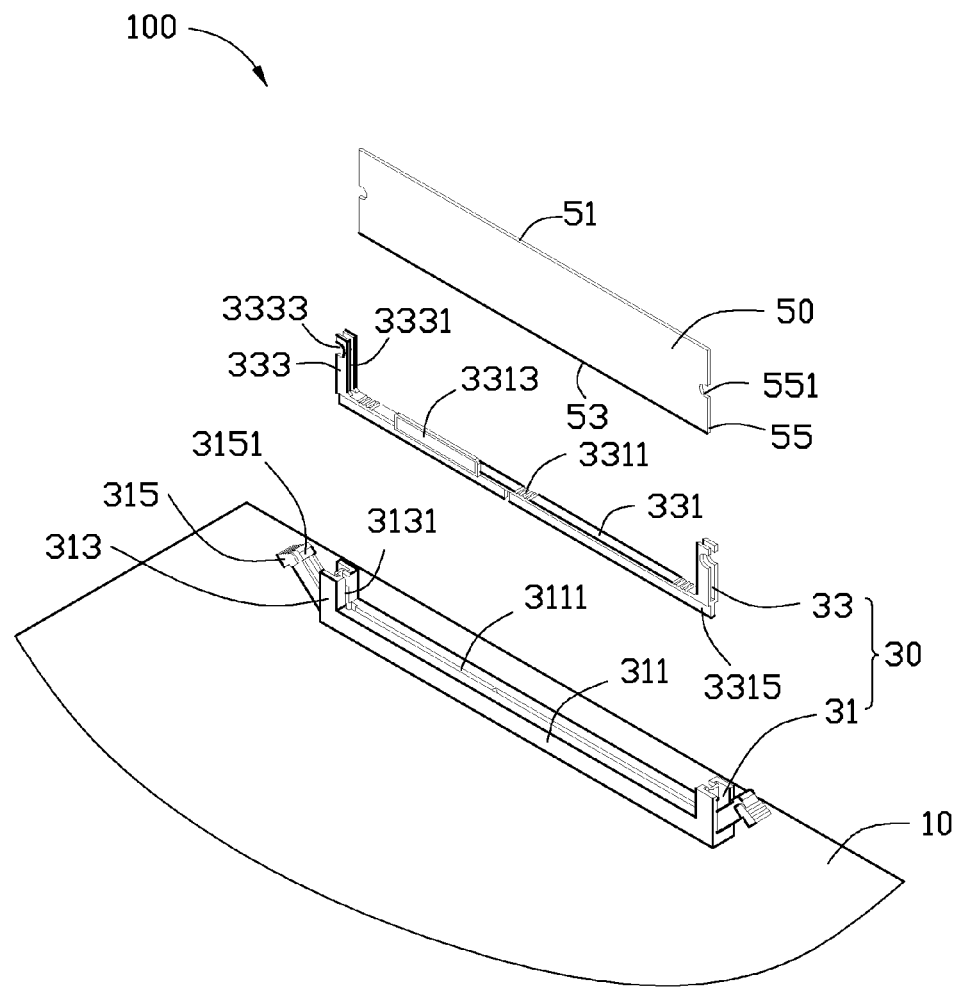
FIG. 1 is an exploded, isometric view of a first exemplary embodiment of a memory module holder.
Figure 2:
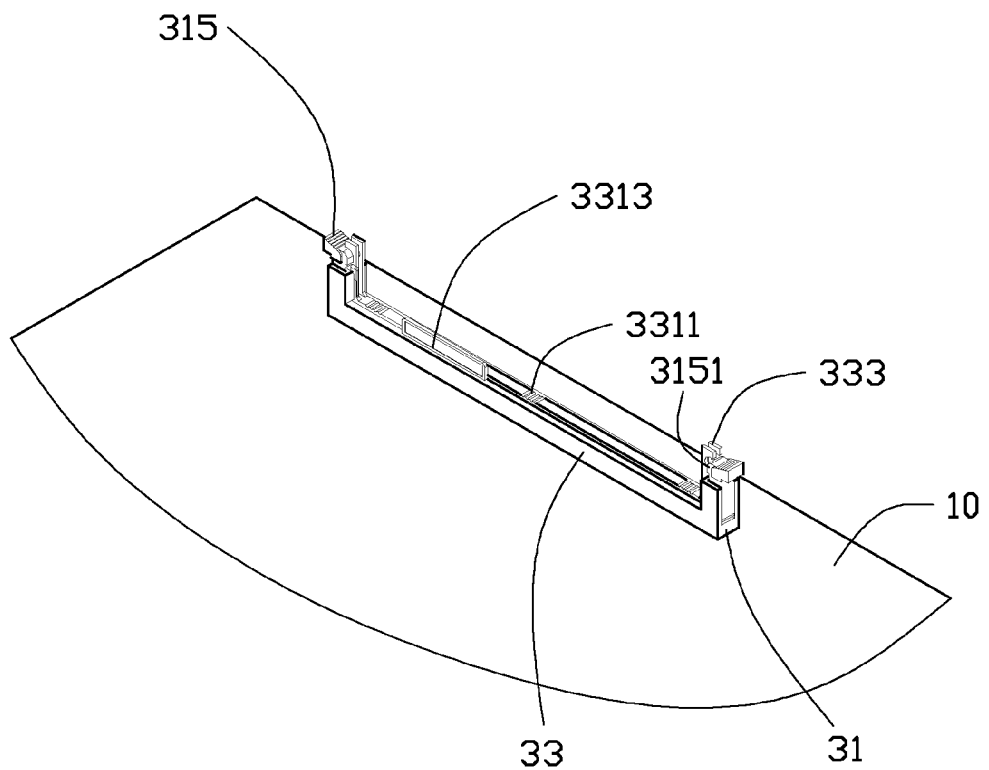
FIG. 2 is an assembled, isometric view of the memory module holder of FIG. 1.
Figure 3:
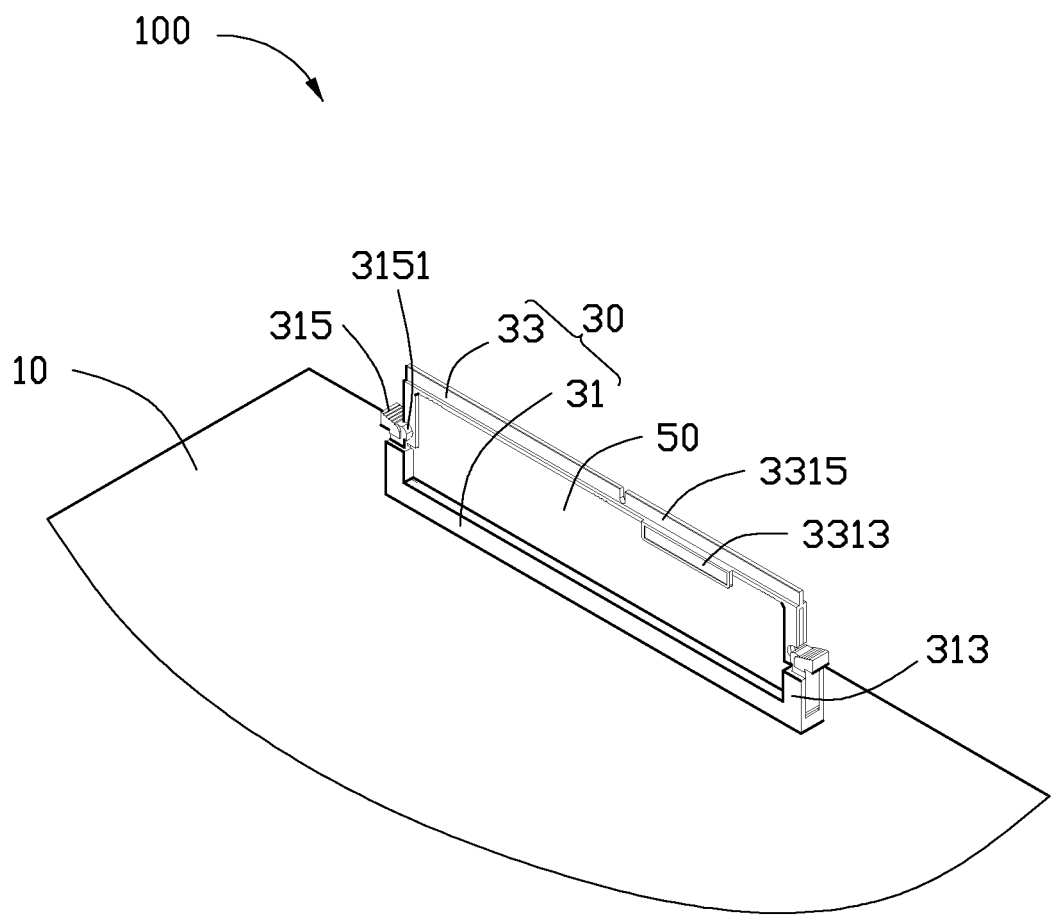
FIG. 3 is similar to FIG. 2, but showing a frame inverted secured to a base with a memory module.
Figure 4:
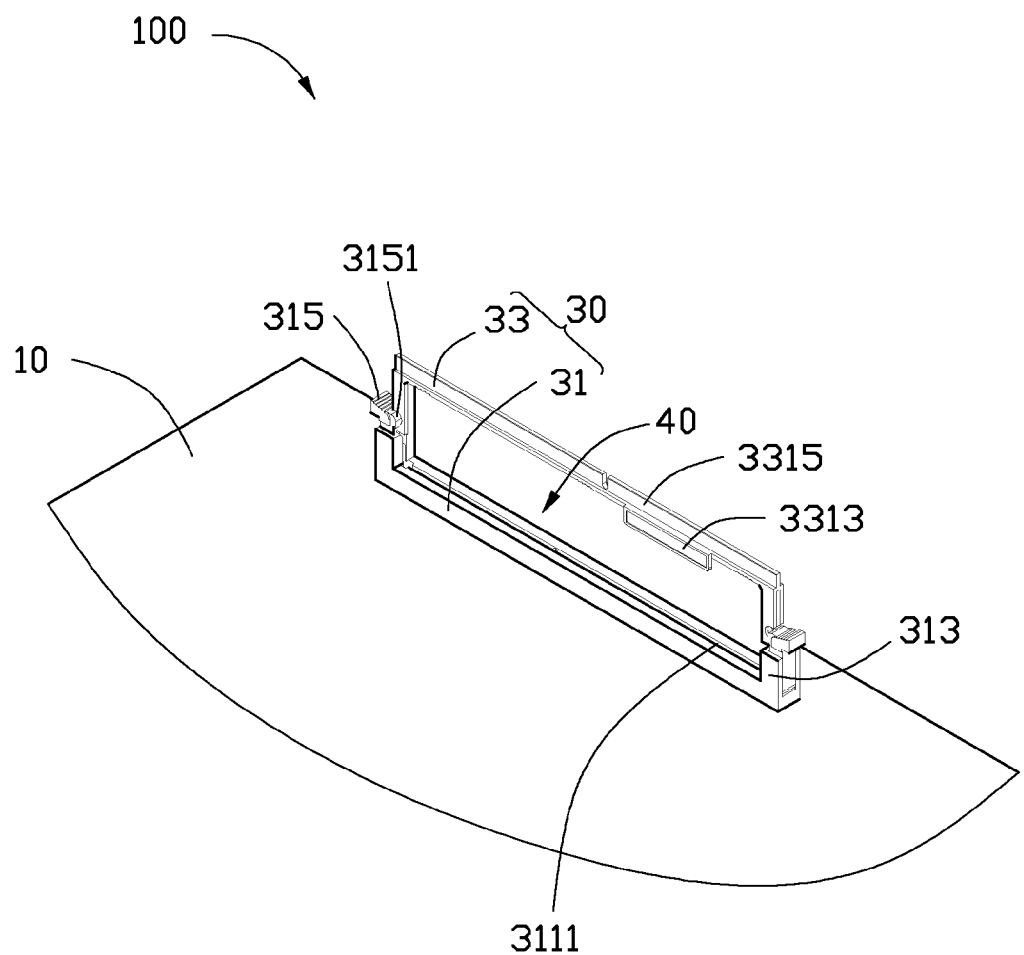
FIG. 4 is similar to FIG. 3, but showing a memory module attached to the memory module holder.

FIG. 1 illustrates a memory module holder 100 for electronic device where a memory module 50 to store data is desired. The memory module 50 may be a single inline memory module (SIMM), a dual inline memory module (DIMM), a small outline dual inline memory module (SO-DIMM), or a fully buffered dual inline memory module (FB-DIMM). The memory module holder 100 includes a stand 30 disposed on a printed circuit board (PCB) 10. The stand 30 includes a base 31 and a frame 33. A slot 3111 is defined in the base 31. A number of connector pads (not shown) are secured to opposite sidewalls inside of the slot 3111 to electrically connect to the memory module 50. The frame 33 may be detachably attached to the base 30 in two different ways. If the frame 33 is latched in the slot 3111 of the base 31, the memory module holder 100 is in a first state, as shown in FIG. 2. If the frame 33 is reversely latched to the base 31 to define a receiving space 40 (see FIG. 3) for receiving the memory module 50, the memory module holder 100 is in a second state, as shown in FIG. 4.

The base 31 includes a base portion 311 and two arms 313. The two arms 313 are formed at opposite ends of the base portion 311 and are substantially parallel to each other. A groove 3131 is defined in each arm 313. Two latching elements 315 are rotatably received in the grooves 3131 to allow the frame 33 to be attached to the base 31 in different ways. A projection 3151 extends from each latching element 315 to latch the frame 33 to the memory module 50.

The frame 33 includes a beam portion 331 and two latching portions 333. The latching portions 333 are positioned at opposite ends of the beam portion 331 and are substantially parallel to each other. A number of striations 3311 are formed in the beam portion 331 to allow the frame 33 to be easily held during assembly or disassembly. An identification plate 3313 extends from one side of the beam portion 331 in a direction along the two latching portions 333. The identification plate 3313 indentifies where the memory module 50 is to be loaded. An extension plate 3315 extends from the beam portion 331 in a direction opposite to the identification plate 3313. A width of the extension plate 3315 is substantially equal to a width of the memory module 50 and is smaller than a width of the beam portion 331.

A through hole 3331 and a cutout 3333 are defined in each lathing portion 333. The width of each through hole 3331 is substantially equal to the width of the memory module 50. The cutouts 3333 receive the projections 3151 when the frame 33 is secured to the base 30.

The memory module 50 includes a first side 51, a second side 53 opposite to the first side 51, and two opposite ends 55. A latching hole 551 is defined in each end 55 to receive the projection 3151 of the corresponding latching element 315.

During assembly, opposite ends 55 of the memory module 50 are inserted into the through holes 3331 of the frame 33 so that each latching hole 551 aligns with the corresponding cutout 3333. The frame 33 with the memory module 50 is secured to the base 31. The first side 51 is inserted into the slot 3111 of the base 31 and is electrically connected to the connector pads in the slot 3111. Each latching element 315 is rotated so that the projection 3151 is received in the corresponding cutout 3333 and the latching hole 551. Thus, the memory module holder 100 is assembled, as shown in FIG. 4. Since the memory module 50 is held and is retained by the base 31 and the frame 33, the rigidity is improved, and the memory module 50 will have less deformation when heated in use.

If the memory module 50 breaks down or is replaced, the latching elements 315 are rotated away from the memory module 50, the projections 3151 are removed from the cutouts 3333 and the latching holes 551 so that the memory module 50 can be removed from the stand 30.

When the holder 110 is unused because of replacement or repair of the memory module 50, referring to FIG. 2, the frame 33 is secured to the base 31 by the latching elements 315. The projections 3151 of the latching elements 315 are received in corresponding cutouts 3333 of the frame 33. The extension plate 3315 is received in the slot 3111. The beam portion 331 of the frame 33 covers slot 3111 to protect the conductor pads in the slot 3111 from becoming oxidized and to prevent dust or other contaminants from polluting the conductor pads. The identification plate 3313 identifies the specification of the memory module 50 that is to be loaded so a user can choose a right memory module 50.

When the memory module 50 is to be loaded in the memory module holder 100, the frame 33 is first removed from the base 31, and the rest of the processes refer to the processes of assembly.

Figure 5:
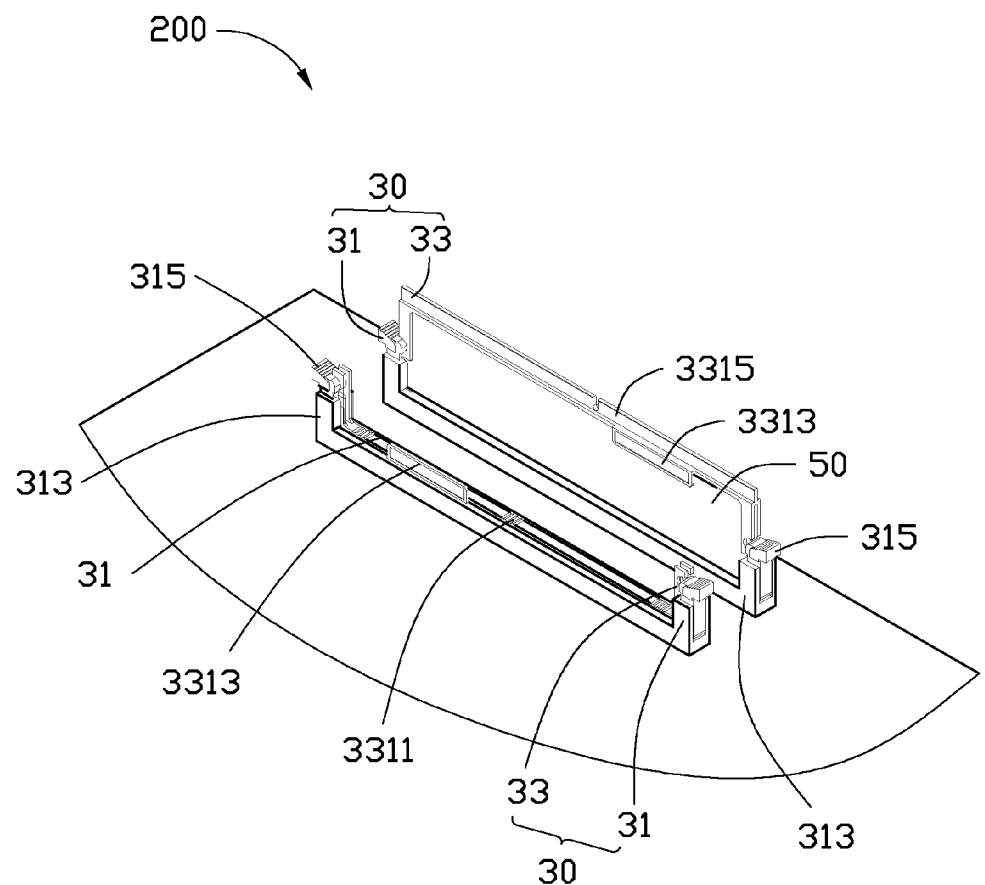
FIG. 5 is an assembled, isometric view of a second exemplary embodiment of memory module holder.

Referring to FIG. 5, a second embodiment of a memory module holder 200 is illustrated. The memory module holder 200 includes two stands 30. In the exemplary embodiment, one stand 30 holds a memory module 50, and the other stand 30 is not occupied by a memory module 50.

It is to be understood that the number of the stands 30 can be increased or decreased as desired.

Refer to FIGS. 2 and 4, in the exemplary embodiments described above, the stand 30 of the memory module holder 100 or 200 includes a frame 33 and a base 31. The frame 33 and the base 31 define a receiving space 40 to receive the memory module 50, or the beam portion 331 of the frame 33 shields the slot 3111 when the frame 33 is inverted to be secured to the base 31. In the first state, the frame 33 and the base 31 can hold the memory module 50 so that the rigidity of the memory module 50 can be improved. In the second state, the slot 3111 of the base 31 is protected by the frame 33 to prevent the connector pads from getting oxidized and prevent dust or the like from polluting the connector pads.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being preferred or exemplary embodiments of the disclosure.

What is claimed is:

1. A memory module holder to hold a memory module, the memory module holder comprising:
    a base being a beam, and defining a slot;
    two latching elements rotatably attached to opposite ends of the base; and
    a frame comprising a beam portion and two latching portions, the two latching portions positioned at opposite ends of the beam portion, an extension plate integrally extending from the beam portion and being parallel to the beam portion;
    wherein the memory module is inserted into the slot, the frame is positioned on the base and the latching portions are retained by the latching elements, to hold the memory module in the base when the memory module holder is in a first state; the extension plate is inserted into the slot and the beam portion overlaps with the base portion for covering the slot when the memory module holder is in a second state.

2. The memory module holder claimed of claim 1, wherein a projection extends from each latching element, a cutout is defined in each latching portion to receive the corresponding projection.

3. The memory module holder claimed of claim 1, wherein a width of the extension plate is substantially equal to a width of the slot and is smaller than the width of the beam portion.

4. The memory module holder claimed of claim 3, wherein an identification plate extends from one side of the beam portion in a direction opposite to and parallel to the extension plate.

5. The memory module holder claimed of claim 1, wherein a plurality of striations are formed in the beam portion.

6. The memory module holder claimed of claim 1, wherein a length of the extension plate is equal to a length of the beam portion.

7. The memory module holder claimed of claim 1, wherein the base includes a base portion and two arms formed at opposite ends of the base portion, the slot is defined on the base portion, a groove is defined in each arm, and communicates with the slot.

8. The memory module holder claimed of claim 7, wherein the two latching elements are rotatably received in the grooves.

9. A memory module holder to hold a memory module, the memory module holder comprising:
    a base defining being a beam, and defining a slot;
    two latching elements rotatably attached to opposite ends of the base; and
    a frame comprising a beam portion and two latching portions, the two latching portions positioned at opposite ends of the beam portion, the latching portions retained in the latching element, an extension plate integrally extending from the beam portion and being parallel to the beam portion, the extension plate inserted into the slot, and the beam portion overlapping with the base portion for covering the slot;
    wherein the memory module is inserted into the slot, the frame is invertedly positioned on the base to hold the memory module in the base.

10. The memory module holder claimed of claim 9, wherein a projection extends from each latching element, a cutout is defined in each latching portion to receive the corresponding projection.

11. The memory module holder claimed of claim 9, wherein a width of the extension plate is substantially equal to a width of the slot and is smaller than the width of the beam portion.

12. The memory module holder claimed of claim 11, wherein an identification plate extends from one side of the beam portion in a direction opposite to and parallel to the extension plate.

13. The memory module holder claimed of claim 9, wherein a plurality of striations are formed in the beam portion.

14. A memory module holder comprising:
    at lease one memory module; and
    at lease one stand, the at least one stand comprising:
    a base being a beam, and defining a slot;
    two latching elements rotatably attached to opposite ends of the base; and
    a frame comprising a beam portion and two latching portions, the two latching portions oriented at opposite ends of the beam portion, the latching portions retained by the latching elements, a receiving space defined by the frame and the base to receive the memory module, an extension plate integrally extending from the beam portion and being parallel to the beam portion;
    wherein the extension plate is inserted into the slot, and the beam portion overlaps with the base portion for covering the slot when the frame is invertedly secured to the base.

15. The memory module holder claimed of claim 14, wherein a projection extends from each latching element, a cutout is defined in each latching portion to receive the corresponding projection.

16. The memory module holder claimed of claim 14, wherein a width of the extension plate is substantially equal to a width of the slot and is smaller than the width of the beam portion.

17. The memory module holder claimed of claim 16, wherein an identification plate extends from one side of the beam portion in a direction opposite to and parallel to the extension plate.

18. The memory module holder claimed of claim 14, wherein a plurality of striations are formed in the beam portion.

19. The memory module holder claimed of claim 14, wherein the memory module is a single inline memory module, a dual inline memory module, a small outline dual inline memory module, or a fully buffered dual inline memory module.

* * * * *